United States Patent [19]

Okamoto et al.

[11] 4,358,306
[45] Nov. 9, 1982

[54] METHOD FOR MOLDING A FUSED QUARTZ GLASS BLOCK

[75] Inventors: Haruo Okamoto; Motoyuki Yamada, both of Joetsu, Japan

[73] Assignee: Shin-Etsu Chemical Co., Ltd., Tokyo, Japan

[21] Appl. No.: 308,588

[22] Filed: Oct. 5, 1981

[30] Foreign Application Priority Data

Oct. 6, 1980 [JP] Japan ................................. 55-139673

[51] Int. Cl.³ ........................ C03B 29/02; C03B 11/00
[52] U.S. Cl. .......................................... 65/32; 65/33; 65/63; 65/102; 65/112
[58] Field of Search ..................... 65/32, 33, 63, 102, 65/112

[56] References Cited

U.S. PATENT DOCUMENTS

| | | | |
|---|---|---|---|
| 2,852,891 | 9/1958 | George | 65/86 X |
| 3,128,166 | 4/1964 | Hohn | 65/33 X |
| 3,214,254 | 10/1965 | Remington | 65/32 |
| 3,243,274 | 3/1966 | Kolbe | 65/102 X |
| 4,139,677 | 2/1979 | Blair et al. | 65/32 X |

*Primary Examiner*—Robert L. Lindsay, Jr.
*Attorney, Agent, or Firm*—Toren, McGeady & Stanger

[57] ABSTRACT

The invention provides a method for molding a block of a fused quartz glass by the plastic deformation of a starting block with smaller dimensions at a high temperature. The molding procedure is carried out in a graphite mold under compression at a temperature of 1700° C. or higher in an atmosphere of helium at a pressure in the range, preferably, from 50 to 500 Torr. The cooling schedule as specified is also of importance in order that the molded quartz glass block is freed from any strain or cracks.

8 Claims, 3 Drawing Figures

METHOD FOR MOLDING A FUSED QUARTZ GLASS BLOCK

BACKGROUND OF THE INVENTION

The present invention relates to a method for molding a fused quartz glass block or, more particularly, relates to a method for shaping a fused quartz glass, which may be either obtained from natural quartz or obtained synthetically from a volatile silicon compound such as silicon tetrachloride and silanes, by the plastic deformation under a compressive force into a block of a desired form.

Fused quartz glasses are obtained primarily in a form of block or rod in a variety of methods known in the prior art. For example, U.S. Pat. No. 2,852,891 discloses a method in which finely divided granules of quartz are melted in an electric furnace and drawn out of the opening in the bottom of the furnace. Further, a method is disclosed in which finely divided particles of quartz are blown with a jet of high temperature flame at a rotating mandrel so that the molten quartz particles deposit successively to form a grown rod (see U.S. Pat. No. 3,128,166 and Japanese Patent Publication No. 46-42111).

Apart from the above mentioned processes applicable to the preparation of fused quartz glass starting with natural quartz, so-called synthetic quartz glass is manufactured by the process, for example, disclosed in U.S. Pat. No. 2,272,432 according to which a volatile halogenated compound of silicon such as silicon tetrachloride is subjected to vapor-phase hydrolysis in an oxyhydrogen flame and the fine particles of silica formed by the hydrolysis are blown at a rotating target of quartz glass heated at a temperature higher than the vitrification temperature by the heat of combustion to be deposited thereon forming a block on the target.

The above described method of vapor-phase hydrolysis or vapor-phase decomposition is of course applicable to other kinds of volatile silicon compounds in place of the silicon tetrachloride such as silane $SiH_4$ (see Japanese Patent Kokai No. 50-21993) and volatile alkoxysilanes represented by the general formula $R_nSi(OR')_{4-n}$, in which R and R' are each a hydrogen atom or a monovalent hydrocarbon group (see U.S. Pat. No. 2,852,891).

The above described methods of vapor-phase decomposition in a high temperature flame are advantageous when the fused quartz glass formed thereby is desired to be uniformly doped with a controlled amount of a dopant such as germanium, aluminum, iron, boron, phosphorus, zinc, tin and the like with an object to modify the refractive index or other properties of the fused quartz glass. That is, the vapor of a volatile compound of such a dopant element is admixed with the vapor of the silicon compound in a controlled proportion either in the flame or before entering the flame to be decomposed together so that the uniformity of the distribution of the dopant element is ensured throughout the glass block although it is optional that the above mentioned volatile compound of the dopant element is replaced with an oxide of the element prepared in advance.

Generally, the blocks of the fused quartz glass obtained in either of the above described methods are in the form of a rod having a circular cross section and the diameter of the rod is also limited according to the principle of the method. Therefore, it is sometimes desired that the quartz glass block to be subjected to a further fabrication by cutting or the like mechanical working means should have a larger diameter than the blocks as prepared by the above described methods or the block has a different cross sectional form than circular such as square, rectangular, elliptic and the like in order to minimize the loss of the material in the mechanical working. For example, a rod with a square cross section may be prepared by cutting and grinding of a circular rod but the loss of the material by the mechanical working is 36.3% by a geometrical calculation assuming that the length of the diagonal of the square is equal to the diameter of the circular rod. The loss of the material in the mechanical working is even larger when a rod of more complicated or irregular cross section is to be fabricated from a circular rod of the fused quartz glass.

Moreover, blocks of fused quartz glass as prepared by the above described methods cannot be free from striae, i.e. striated structure caused by the growth of the block, and local inclusion of foreign materials as well as strains caused by the inhomogeneity in the distribution of the foreign materials. These striae and the inhomogeneity in the composition of the glass are hardly removed by the annealing conventionally undertaken for removing the thermal stress.

Unless the above problems are satisfactorily solved, application of fused quartz glass is limited, especially, as a part of optical instruments such as lenses, prisms and the like.

SUMMARY OF THE INVENTION

An object of the present invention is therefore to provide a novel and improved method for shaping a block of fused quartz glass having a larger cross section than the starting rod-like block by the compression molding to cause plastic deformation of the starting block at a high temperature.

Thus, the method of the present invention for shaping a block of the fused quartz glass from a starting rod-like block comprises placing the starting block of the fused quartz glass in a mold made of graphite, causing plastic deformation of the starting block by compression under an atmosphere of helium to fill the graphite mold at a temperature of 1700° C. or higher, rapidly cooling the block in the graphite mold down to a temperature in the range from 1100° to 1300° C. and taking the block out of the graphite mold.

The graphite mold to be used is preferably a split mold dividable into two pieces or more to facilitate taking of the shaped block out of the mold. Further, it is preferable that the graphite mold is coated on the inward surface thereof with a coating layer of silicon carbide.

DETAILED DESCRIPTION OF THE PREFERRED EMBODIMENTS

Figure 1:
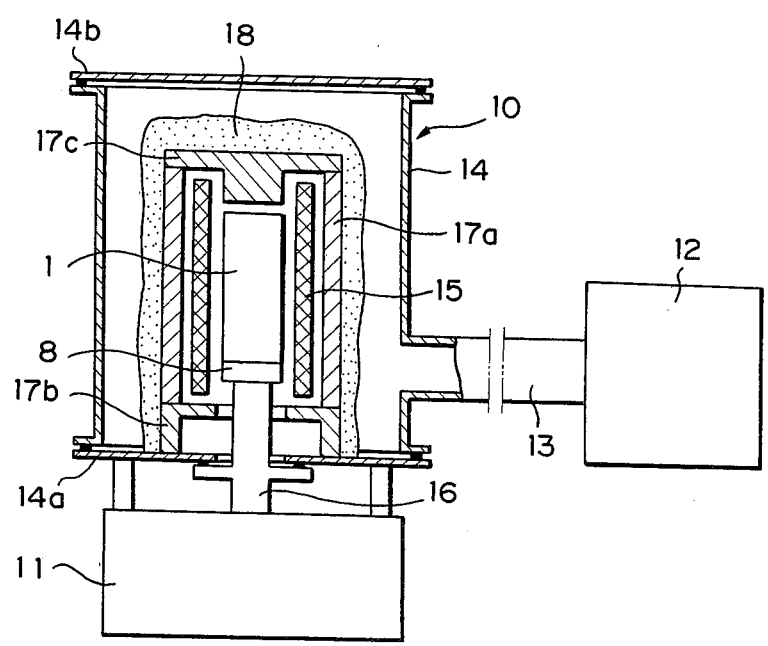
FIG. 1 is a schematic cross sectional view of the apparatus for shaping the quartz glass block according to the invention.

As is mentioned above, the present invention provides a means for obtaining a quartz glass block of any desired form having a substantially larger cross section than the starting quartz glass block freed from the problems of the striae and the compositional inhomogeneity caused by the localization of impurities or dopants. Because the quartz glass block obtained by the inventive method may have a cross section close to that of the final product to be fabricated by mechanical working of the quartz glass block, great economical advantages are obtained not only in the great reduction of the loss of the material for the portions removed by the mechanical working but also in the saving of labor and time required for the mechanical working.

Owing to the absence of striae and compositional inhomogeneity, the quartz glass block shaped by the inventive method is quite satisfactory for the preparation of parts of precision optical instruments such as lenses and prisms. The quartz glass block is also suitable for the preparation of substrate plates for masking used in the lithographic process in the manufacture of various kinds of semiconductor devices. In this case, in particular, the quartz glass block obtained by the inventive method is very advantageous because the lithographic masking plates are usually square or rectangular fabricated only with a large loss of the material in the mechanical working from a cylindrical block.

The method of the present invention is now described in detail with reference to the drawing annexed.

The starting quartz glass block, usually in the form of a rod, obtained either of the above described methods first cut into a suitable length and the outer surface thereof is ground mechanically to remove any foreign materials adhering to the surface by use of a suitable grinding machine such as a diamond grinder or an oblique cylindrical cutting machine to be imparted with an approximately smooth surface followed by rinsing with an organic solvent such as trichloroethylene to remove organic materials and etching in an aqueous hydrofluoric acid solution of 10 to 50% concentration to remove metallic impurities on the surface with subsequent rinsing with water and drying.

Figure 2A:
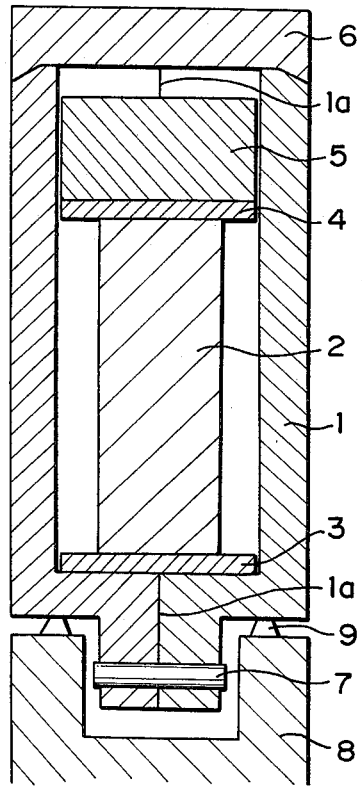
FIGS. 2a and 2b are each a schematic cross sectional view of the graphite mold containing or filled with the quartz glass block either before (FIG. 2a) or after (FIG. 2b) compression.
Figure 2B:
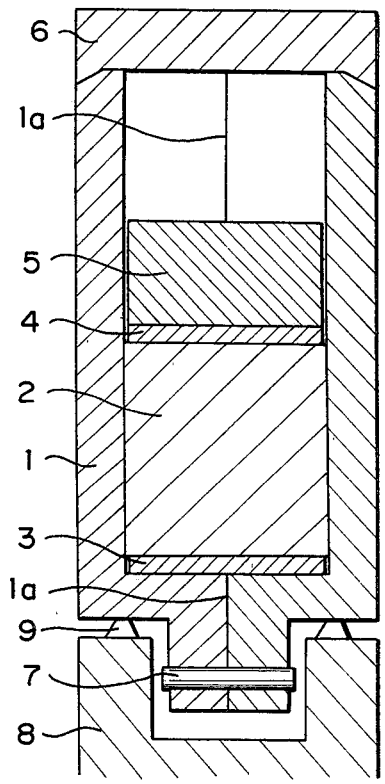

The quartz glass block thus prepared and cleaned is placed in a graphite mold as shown in FIG. 2. The graphite mold is, as is shown in FIG. 2, preferably a split mold dividable into two pieces or more at a vertical plane 1a or planes. The starting quartz glass block 2 is placed on the base plate 3 also made of graphite covering the bottom of the mold 1. This base plate 3 serves to prevent leakage of molten quartz through the interstice 1a between the sections of the split mold 1 as well as to protect the bottom of the mold 1 from wearing out. The quartz glass block 2 is overlaid with an upper board 4 of graphite and pressed with a weight 5 which is also made of graphite and mounted on the upper board 4. The graphite weight 5 should preferably be as large as to give a pressure of 1 to 100 g/cm$^2$ or, more preferably, 5 to 20 g/cm$^2$ to the quartz glass block. The upper board 4 and the weight 5 must be vertically movable freely with small but not excessively large clearances between the peripheries of them and the inward surface of the mold 1.

When the quartz glass block 2, upper board 4 and weight 5 have been placed in the positions as shown in FIG. 2a, the mold 1 is covered with a cap 6 also made of graphite. This cap 6 serves also to fasten the sections of the split mold 1 together with the pins, one at the bottom 7 and two at the upper part of the mold 1 (not shown in the figure). These pins are inserted to the mold 1 loosely enough so that, after completion of the shaping according to the invention, the split mold 1 can readily be divided into the individual sections by removing the pins to facilitate taking of the molded quartz glass block out of the thus divided mold 1.

The mold 1 thus assembled is mounted on the mold base 8 to be seated on the rails 9 in the furnace 10 (see FIG. 1). Each of the rails 9 should have such a cross section that the contacting area between the mold 1 and the rails 9 is minimum in order to minimize the flow of heat therethrough. FIG. 2 shows a triangular cross section of the rails 9 so that the heat conduction between the mold 1 and the mold base 8 is limited to the very narrow linear areas between the mold 1 and the rails 9.

Needless to say, the graphite of which the mold 1 as well as the base board 3 and the upper board 4 are made must have a purity as high as possible in order to avoid possible contamination of the quartz glass block coming into contact with the surface of the graphite parts at high temperatures.

FIG. 1 illustrates an axial cross sectional view of the furnace 10 as a whole mounted on the elevator stand 11 and connected to a vacuum pumping system 12 through a vacuum duct 13. Inside the furnace chamber 14 which is of course vacuum-tight, there are provided a plurality of heater elements 15 surrounding the graphite mold 1 mounted on the mold base 8 which is in turn fixed on top of the elevator shaft 16 penetrating the bottom 14a of the furnace chamber 14 with vacuum-tightness. The heater elements 15 may be electric resistance heaters and can be heated through terminals and bushings (not shown in the figure) connected to an outer power source (not shown in the figure). The heater elements 15 are surrounded by heat reflectors 17a, 17b, 17c of graphite which are further enveloped by a heat-insulating mantle 18 made of a carbonaceous material.

The above mentioned setting of the heat reflector 17c and the heat-insulating mantle 18 is of course carried out after the mold 1 has been brought to an optimum position to ensure highest efficiency of heating by the vertical movement of the elevator shaft 16. After completion of setting of the mold 1, heat reflector 17c and the heat-insulating mantle 18, the furnace chamber 14 is closed with the cover 14b vacuum-tightly and the vacuum pumping system is operated to evacuate the furnace chamber 14 to a pressure of $10^{-2}$ to $10^{-5}$ Torr and then helium gas is introduced into the furnace chamber 14 through a gas inlet (not shown in the figure) to give a pressure between 0.1 Torr and the atmospheric pressure or, preferably, from 50 to 500 Torr followed by temperature elevation with supply of electric power to the heater elements 15. The temperature elevation must follow a schedule programmed in advance. It is important that the time lag between the power input and the temperature rise of the body under heating should be compensated for by a suitable automatic control of the power input.

The essential points in practicing the method of the present invention are the maximum temperature at which the quartz glass block is subjected to plastic deformation, the duration for keeping the block at the temperature, the velocity of temperature elevation to the temperature of plastic deformation and the velocity of cooling.

As is known, thermally induced plastic deformation of a quartz glass begins to proceed usually at a temperature between 1100° and 1200° C. and the rate of deformation is considerably large at 1700° C. or higher. This behavior of deformation corresponds to the decrease of the viscosity of the glass with the increase in the temperature indicating a viscosity of about $10^{13}$ poise at 1200° C. and about $10^7$ poise at 1700° C. In case of a synthetic quartz glass, this viscosity behavior is largely dependent on the content of the hydroxy groups in the glass. For example, a synthetic quartz glass containing 1000 to 1300 p.p.m. of hydroxy groups exhibits about the same behavior of thermal deformation at a temperature lower by 100° C. than the temperature at which a quartz glass prepared with natural quartz shows the same degree of plastic deformation.

In the inventive method, the thermally induced plastic deformation of the quartz glass under compression is effected at a temperature of 1700° C. or higher or, preferably, between 1730° and 1800° C. When the temperature is lower than above, the rate of deformation under a pressure is small so that desired degree of deformation can be obtained only by extending the time of molding or by increasing the compressive pressure as in a hot press. Incidentally, crystallization or devitrification takes place when the quartz glass is kept prolongedly at a temperature somewhat lower then 1700° C. beginning at the surface layer of the glass block followed by gradual propagation into the core. Further it is entirely impractical to use a sufficiently large pressure to cause plastic deformation of quartz glass at a temperature below 1700° C. When the temperature exceeds 1800° C., on the other hand, the vapor pressure of silicon dioxide increases to such an extent that certain loss of the quartz glass material is caused by the vaporization of the silicon dioxide in addition to the difficulties usually encountered in high temperature processes.

Furthermore, it is important that the graphite mold should be designed to be free from the large strain in the course of cooling after plastic deformation at the high temperature caused by the large difference in the thermal expansion coefficients between graphite and fused quartz glass, the values being $8 \times 10^{-6}$/°C. for the former and $5.5 \times 10^{-7}$/°C. for the latter. In this respect, the inventive method uses a split mold divided into two or more pieces so that the stress caused by shrinking of the mold is released not to give an undue stress to the quartz glass block under cooling without the danger of cracks or strain.

The time required for the plastic deformation of the quartz glass naturally depends on several parameters such as the temperature, compressive pressure, the form of the block to be shaped and the like. Generally, the time is from 10 to 180 minutes at a temperature in the range from 1700° to 1800° C.

When the quartz glass has been sufficiently deformed to have a desired form filling the graphite mold, rapid cooling is very essential down to a temperature in the range from 1100° to 1300° C. in order to avoid devitrification of the glass. The time taken for this rapid cooling, i.e. the time taken for cooling from the temperature of the plastic deformation to the temperature between 1100° and 1300° C., should not exceed 60 minutes or, preferably, from 10 to 60 minutes. Once the temperature in the range from 1100° to 1300° C. has been reached, the rate of cooling thereafter must be slowed down not to exceed 100° C./hour at least until a temperature of 900° C. or below has been reached. This slow cooling is effective to minimize possible strain or cracks in the quartz glass block so that the quartz glass block taken out of the mold can be worked as such by mechanical means such as cutting and grinding without causing any defects at all. When the rate of this slow cooling exceeds 100° C./hour, local strain is unavoidable in the glass block and cracks sometimes are formed with a cooling rate exceeding 200° C./hour.

The mold used in the inventive method is preferably made of graphite of a purity as high as possible. The mold is preferably designed as a split mold dividable in a vertical plane. When the mold is used for shaping a cylindrical block, the dividing plane of the split mold preferably includes the axis of the cylinder while a split mold used for shaping a block having a square or rectangular cross section is preferably dividable in a vertical plane involving one of the diagonals of the cross section. It is of course that dividing of the split mold is not limited into two pieces but a mold may be dividable into three or more pieces depending on the form of the block to be shaped. The dividing plane or planes of the split mold are not limited to vertical but may be horizontal, if necessary, to obtain replaceability of the portion subject to the most intensive thermal erosion.

The advantage in the inventive method is that the quartz glass block obtained by the method is freed from any streaking texture called striae due to the fluctuation in the composition and local residual stress, presumably, by virtue of the molecular diffusion and mutual material transfer by mixing taking place in the glass material.

Another essential requirement in the inventive method is to fill the gaseous atmosphere with helium gas at a pressure in the range from 0.1 Torr to atmospheric pressure or, preferably, from 50 to 500 Torr. When this atmospheric condition is followed, the evaporation loss of the quartz glass can be minimized not to exceed 0.5% and the wearing of the heater elements, thermal insulating material and other carbon materials can be remarkably decreased. For example, the heater elements can be used without replacement for a length of cumulative 5000 hours and the graphite mold can be used repeatedly for more than 50 times of molding.

The reason that the atmospheric gas in the inventive method is limited to helium is, on one hand, the less susceptibility of helium to electric discharge therethrough at a high temperature. When a carbon resistance heater is used as the heater element, electric discharge is sometimes unavoidable between the heater elements or between the heater element and another part of graphite electrically insulated from the heater element, e.g. heat reflector, at a high temperature, especially, when the atmospheric gas is argon resulting in rapid consumption of the heater elements and other parts as well as in a breakdown in the electri circuit for controlling the power supply.

The above problem of electric discharge is more serious when heating of the graphite mold is performed by direct high frequency induction heating in place of using resistance heater elements in an argon atmosphere which is readily brought into a state of plasma to cause more rapid consumption of the parts than in a helium atmosphere. The use of nitrogen as the atmospheric gas is quite out of the question since nitrogen is no longer inert at such a high temperature.

The pressure of the helium atmosphere is preferably as high as possible when minimization of the evaporation loss of the quartz glass and the expansion of the bubbles contained in the quartz glass is taken into consideration although the costs due to the helium gas per se and the electric power consumption increase proportionally to the pressure. This is the reason for the upper limit of the helium pressure in the furnace at the atmospheric pressure or, preferably, 500 Torr. The lower limit of the helium pressure is of course determined by the tolerable evaporation loss of the quartz glass and the expansion of the bubbles in the starting quartz glass depending on the origin of the glass. In this regard, the pressure is preferably at least 50 Torr or, more preferably, at least 200 Torr. Therefore, it is desirable that the starting quartz glass block contains as small as possible number of bubbles or the size of the bubbles contained therein is as small as possible.

Following are the examples to illustrate the method of the present invention in further detail.

EXAMPLE 1

A quartz glass block prepared synthetically from silicon tetrachloride and containing 1100 p.p.m. by weight of hydroxy groups was shaped by grinding into a cylindrical form weighing 5680 g and having a diameter of 100 mm and a length of 330 mm. The cylindrical block was placed on the bottom of a graphite mold for shaping a block of square cross section of 130 mm×130 mm with a graphite base plate of 10 mm thickness therebetween. An upper board of graphite of 10 mm thickness and a graphite weight weighing 2500 g having a 129 mm×129 mm square cross section were placed successively thereon. A graphite-made cap with an air escape was put on the mold to cover it.

The graphite mold was mounted on the mold base in a furnace of 60 kw power output and brought to the predetermined height by operating the elevator shaft. The atmosphere inside the furnace was evacuated by operating the vacuum pump to a pressure of 0.01 Torr and then filled with helium gas to give a pressure of 250 Torr. The heater in the furnace was turned on to initiate temperature elevation reaching 1750° C. after 30 minutes and this temperature was maintained for 120 minutes by regulating the power of the heater.

After 120 minutes at 1750° C., the power of the heater was decreased so that the temperature reached 1300° C. minutes and then the rate of cooling was reduced by linearly programmed decrease of the power reaching 900° C. after 5 hours and 40 minutes. The averaged cooling rate in this stage of slow cooling was 70.5° C./hour.

After cooling to room temperature, the graphite mold was taken out of the furnace. The thus molded quartz glass block was readily separated from the mold divided into two pieces without sticking to the walls of the mold. The weight of the quartz glass block was 5660 g showing a loss of 0.35% by evaporation having dimensions of 148 mm height and a cross section of 132 mm×132 mm square. The block was perfectly rectangular excepting the small fins at the upper and lower portions with absolutely no cracks. The block was also completely transparent in all portions showing no strain even by the examination with a strain detector.

EXAMPLE 2

A quartz glass block of the same dimensions as in Example 1 and weighing 5670 g was shaped of a block containing 50 p.p.m. by weight of hydroxy groups made from natural quartz by the flame method. The dimensions of the graphite mold and the procedure for molding the quartz glass block therewith were substantially the same as in Example 1 except that the pressure of helium in the furnace was 450 Torr and the heighest molding temperature was 1800° C. kept for 90 minutes. The schedule for the temperature elevation up to 1800° C. and cooling down to 1300° C. was also the same as in Example 1.

The thus molded quartz glass block weighing 5657.5 g was rectangular having a cross section of 133 mm×133 mm and a height of 145 mm with very small finned portions. The weight loss by evaporation was 0.22%. The block was free from cracks and no strain was detected even by the examination with a strain detector.

EXAMPLE 3

A cylindrical block weighing 420 g having a diameter of 50 mm and a length of about 95 mm was shaped by grinding a starting quartz glass block doped with 2% by weight of germanium synthetically prepared from silicon tetrachloride by use of oxyhydrogen flame.

The block was placed in a graphite-made split mold dividable into two pieces having a square cross section of 65 mm×65 mm. The molding procedure was substantially the same as in Example 1 except that the pressure of helium was 500 Torr and the molding temperature was 1720° C. kept for 20 minutes. The schedule for the temperature elevation and cooling was also the same as in Example 1.

The weight of the thus molded block was 417 g showing a weight loss of 0.72% by evaporation. The content of germanium was found to have decreased to 1.9% by weight.

What is claimed is:

1. A method for shaping a block of a fused quartz glass from a starting quartz glass block which comprises the steps of
   (a) placing the starting block in a mold made of graphite,
   (b) causing plastic deformation of the starting block to fill the mold by compression under an atmosphere of helium at a temperature of 1700° C. or higher,
   (c) rapidly cooling the thus molded block in the graphite mold down to a temperature in the range from 1300° C. to 1100° C.,
   (d) slowly cooling the molded block at a temperature of 1300° to 1100° C. in the graphite mold down to a temperature of 900° C. or below, and
   (e) taking the molded block out of the graphite mold.

2. The method as claimed in claim 1 wherein the mold made of graphite is a split mold.

3. The method as claimed in claim 1 wherein the pressure for compression in the step (b) is in the range from 1 to 100 g/cm$^2$.

4. The method as claimed in claim 1 wherein the pressure of helium in the atmosphere in the step (b) is in the range from 50 Torr to 5000 Torr.

5. The method as claimed in claim 1 wherein the temperature at which the plastic deformation of the starting block is caused is in the range from 1730° C. to 1800° C.

6. The method as claimed in claim 1 wherein the plastic deformation of the starting block is caused over a period of 10 to 180 minutes.

7. The method as claimed in claim 1 wherein the time taken for the rapid cooling in the step (c) is 60 minutes or shorter.

8. The method as claimed in claim 1 wherein the rate of cooling in the step (d) is 100° C./hour or smaller.